United States Patent
Yamaguchi et al.

(10) Patent No.: US 6,846,896 B2
(45) Date of Patent: Jan. 25, 2005

(54) CURABLE COMPOSITIONS

(75) Inventors: Hiromasa Yamaguchi, Gunma-ken (JP); Mikio Shiono, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/690,526

(22) Filed: Oct. 23, 2003

(65) Prior Publication Data
US 2004/0082710 A1 Apr. 29, 2004

(30) Foreign Application Priority Data
Oct. 25, 2002 (JP) .................................... 2002-311087

(51) Int. Cl.$^7$ ............................................. C08G 77/24
(52) U.S. Cl. ............................. 528/36; 528/15; 525/478
(58) Field of Search ....................... 528/36, 15; 525/478

(56) References Cited

U.S. PATENT DOCUMENTS 5,656,711 A * 8/1997 Fukuda et al. ................ 528/15
6,441,079 B2 * 8/2002 Sato et al. ................... 524/448

FOREIGN PATENT DOCUMENTS

| EP | 0 765 916 A2 | 4/1997 |
| JP | 9-95615 A | 4/1997 |
| JP | 2000-212542 A | 8/2000 |

* cited by examiner

Primary Examiner—Kuo-Liang Peng
(74) Attorney, Agent, or Firm—Birch, Stewart, Kolasch & Birch, LLP

(57) ABSTRACT

A curable composition comprising (A) a polyfluorodialkenyl compound having at least two alkenyl radicals, (B) a fluorinated organohydrogensiloxane having at least two Si—H radicals, (C) a platinum group compound, (D) a hydrophobic silica powder, and (E) an organosiloxane having a Si—H radical and a trialkyl or trialkoxy-containing organic radical attached to a silicon atom cures into a product having improved solvent resistance, chemical resistance, heat resistance, low-temperature properties, low moisture permeability and electric properties and exhibiting good adhesion to a variety of substrates including metals and plastics by brief heating at relatively low temperatures.

4 Claims, No Drawings

CURABLE COMPOSITIONS

This nonprovisional application claims priority under 35 U.S.C. §119 (a) on Patent Application No. 2002-31108 filed in JAPAN on Oct. 25, 2002, which is herein incorporated by reference.

This invention relates to curable compositions which cure into products having improved solvent resistance, chemical resistance, heat resistance, low-temperature properties, low moisture permeability and electric properties and exhibit good adhesion to a variety of substrates including metals and plastics by brief heating at relatively low temperatures.

BACKGROUND OF THE INVENTION

Curable fluorinated elastomer compositions utilizing addition reaction between alkenyl and hydrosilyl radicals are well known in the art. It is also known from JP-A 9-95615 to add an organopolysiloxane having a hydrosilyl radical and an epoxy and/or trialkoxysilyl radical as a third component to such a composition for rendering it self-adhesive. This composition can be cured by brief heating. Since the cured product has good solvent resistance, chemical resistance, heat resistance, low-temperature properties, low moisture permeability and electrical properties, the composition is useful in an adhesive application in a variety of industrial fields where such properties are required.

Although the above-referred composition bonds to a variety of substrates, relatively high temperatures (approximately 150° C.) are needed for heat curing, which restrains the application of the composition to those resinous substrates which can be deformed or discolored at high temperatures. The composition cannot be used in the application requiring dimensional stability or applied to electric and electronic parts having heat-vulnerable devices mounted thereon. There exists a need for a curable composition capable of curing at relatively low temperatures into products having improved solvent resistance, chemical resistance, heat resistance, low-temperature properties, low moisture permeability and electric properties.

SUMMARY OF THE INVENTION

An object of the invention is to provide a novel and improved curable composition which cures by brief heating at relatively low temperatures into a product that firmly bonds to a variety of substrates including metals and plastics and has improved solvent resistance, chemical resistance, heat resistance, low-temperature properties, low moisture permeability and electric properties.

It has been found that the above and other objects are attainable by compounding a polyfluorodialkenyl compound, a fluorinated organohydrogenpolysiloxane, a platinum group compound, a hydrophobic silica powder, and an organosiloxane having a hydrogen atom attached to a silicon atom and a specific organic radical attached to a silicon atom.

The present invention provides a curable composition comprising (A) a polyfluorodialkenyl compound having at least two alkenyl radicals in a molecule, (B) a fluorinated organohydrogensiloxane having at least two hydrogen atoms each attached to a silicon atom in a molecule, (C) a platinum group compound, (D) a hydrophobic silica powder, and (E) an organosiloxane having a hydrogen atom attached to a silicon atom and an organic radical attached to a silicon atom in a molecule, the organic radical being represented by the general formula (1):

wherein $R^1$ is an alkoxy radical of 1 to 4 carbon atoms or an alkyl radical of 1 to 4 carbon atoms, $R^2$ is hydrogen or methyl, and "a" is an integer of 2 to 10.

DESCRIPTION OF THE PREFERRED EMBODIMENT

The components of the inventive curable composition are described in detail.

Component (A)

Component (A) in the curable composition of the invention is a polyfluorodialkenyl compound having at least two alkenyl radicals in a molecule. This compound preferably has the following general formula (2).

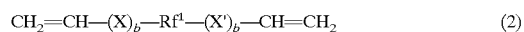

Herein X is a divalent radical represented by —CH$_2$—, —CH$_2$O—, —CH$_2$OCH$_2$— or —Y—NR$^3$—CO— wherein Y is a divalent radical represented by —CH$_2$— or

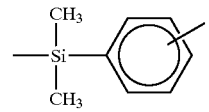

and $R^3$ is hydrogen or a substituted or unsubstituted monovalent hydrocarbon radical. X' is a divalent radical represented by —CH$_2$—, —OCH$_2$—, —CH$_2$OCH$_2$— or —CO—NR$^3$—Y'— wherein Y' is a divalent radical represented by —CH$_2$— or

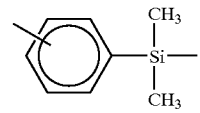

and $R^3$ is as defined above. The subscript "b" is independently equal to 0 or 1. $Rf^1$ is a divalent radical having the general formula (i) or (ii).

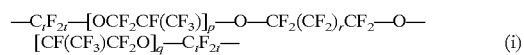

Herein p and q each are an integer of 1 to 150, the sum of p and q on average is 2 to 200, r is an integer of 0 to 6, and t is 1, 2 or 3.

Herein u is an integer of 1 to 200, v is an integer of 1 to 50, and t is as defined above.

$R^3$ involved in X or X' is hydrogen or a substituted or unsubstituted monovalent hydrocarbon radical, preferably having 1 to 12 carbon atoms, more preferably 1 to 10 carbon atoms. Suitable monovalent hydrocarbon radicals include alkyl radicals such as methyl, ethyl, propyl, butyl, hexyl, cyclohexyl and octyl, aryl radicals such as phenyl and tolyl, aralkyl radicals such as benzyl and phenylethyl, and substituted monovalent hydrocarbon radicals in which some or all of the hydrogen atoms are substituted with halogen atoms such as fluorine.

The following three radicals are illustrative of Rf[1] radical, with divalent radicals of the first formula being preferred.

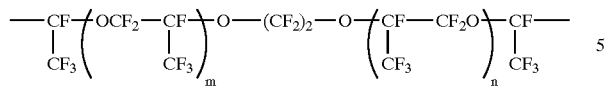

Herein m and n each are an integer of at least 1, and an average of m+n is 2 to 200.

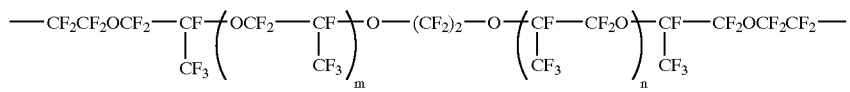

Herein m and n each are an integer of at least 1, and an average of m+n is 2 to 200.

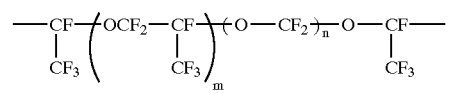

Herein m is an integer of 1 to 200 and n is an integer of 1 to 50.

Illustrative, non-limiting examples of the polyfluorodialkenyl compound having formula (2) are given below.

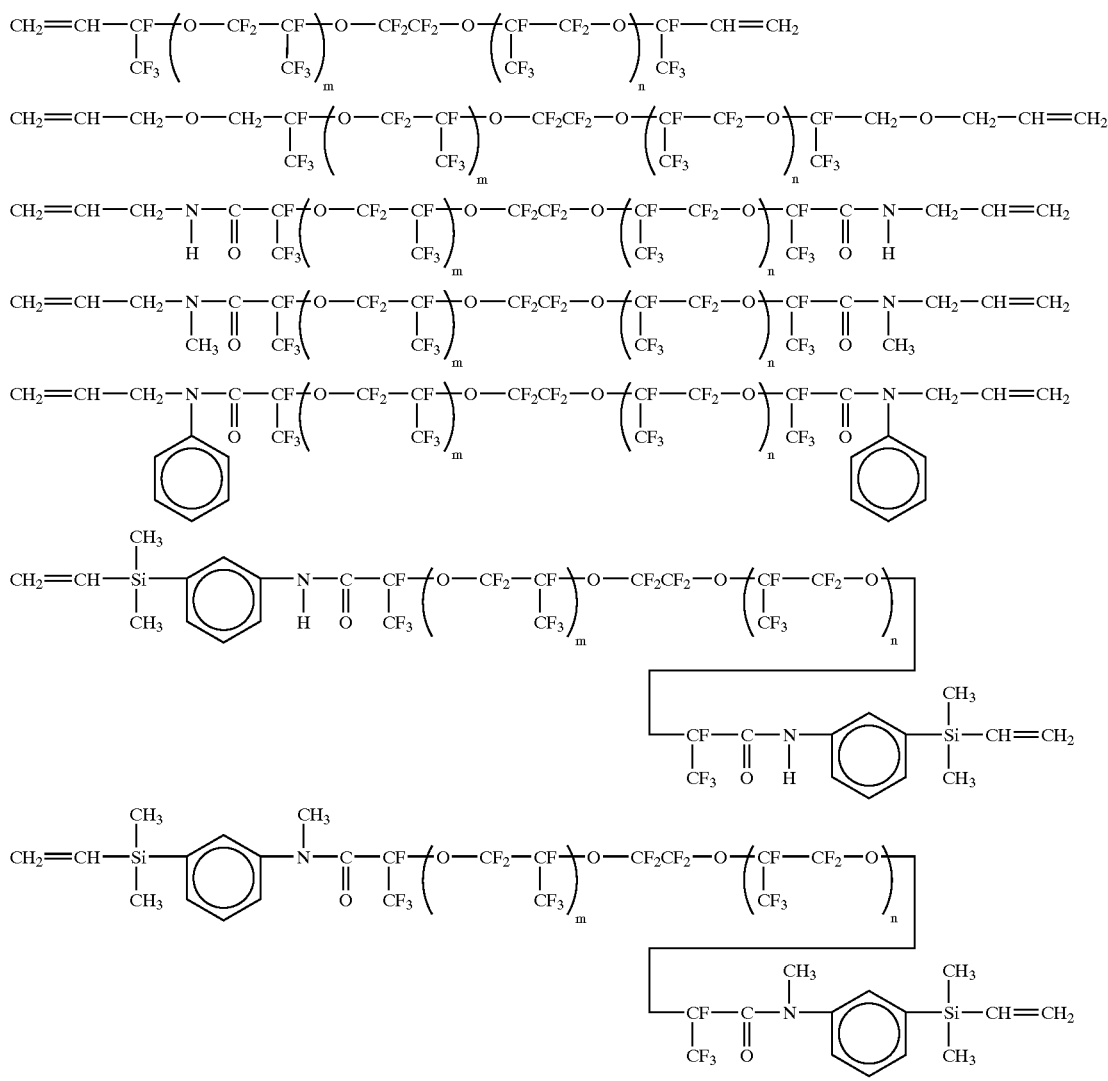

Herein m and n each are an integer of at least 1, and an average of m+n is 2 to 200.

The polyfluorodialkenyl compound having formula (2) should preferably have a viscosity at 23° C. in the range of 5 to 100,000 mPa·s, more preferably 200 to 20,000 mPa·s, most preferably 1,000 to 10,000 mPa·s. Then, the inventive composition comprising the same have an appropriate flow so that the composition is useful in casting, potting, coating, impregnation and adhesion, and its cured product have appropriate physical properties. A most appropriate viscosity for a particular application may be selected within the range.

Component (B)

Component (B) is a fluorinated organohydrogenpolysiloxane having at least two hydrogen atoms attached to silicon atoms in a molecule. It serves as a crosslinker and chain extender for component (A). From the standpoints of compatibility with component (A), dispersion and cured uniformity, the fluorinated organohydrogenpolysiloxane should preferably have at least one fluorinated radical, typically monovalent perfluoroalkyl, monovalent perfluorooxyalkyl, divalent perfluoroalkylene or divalent perfluorooxyalkylene radical in a molecule.

These fluorinated radicals include radicals represented by the following general formulae:

$$C_sF_{2s+1}-$$

wherein s is an integer of 1 to 20, preferably 2 to 10;

$$F-[CF(CF_3)CF_2O]_{n'}-C_tF_{2t}-$$

wherein n' is an integer of 2 to 200, preferably 2 to 100, and t is as defined above;

$$C_gF_{2g}-$$

wherein g is an integer of 1 to 20, preferably 2 to 10; and $$-CF(CF_3)-[OCF_2CF(CF_3)]_m-O-CF_2CF_2-O-$$
$$[CF(CF_3)CF_2O]_n-CF(CF_3)-$$

wherein m and n each are an integer of at least 1, an average of m+n is an integer of 2 to 200, preferably 2 to 100.

Examples of the fluorinated organohydrogensiloxane having such a fluorinated radical are given below. They may be used alone or in admixture of two or more. Note that Me is methyl and Ph is phenyl.

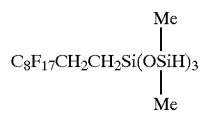

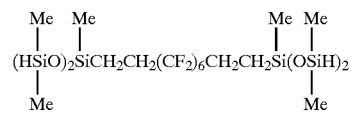

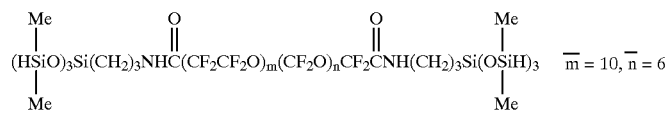 $\overline{m} = 10, \overline{n} = 6$

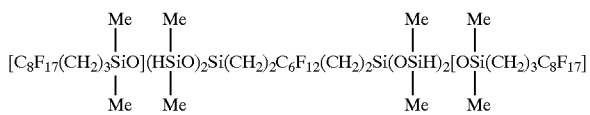

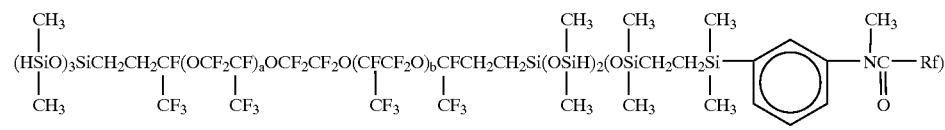

$\overline{a+b} = 3,$ Rf: F—(CFCF$_2$O)$_n$—CF— $\overline{n} = 24$
$a = 1, 2.$ $b = 1, 2$ | | CF$_3$ CF$_3$

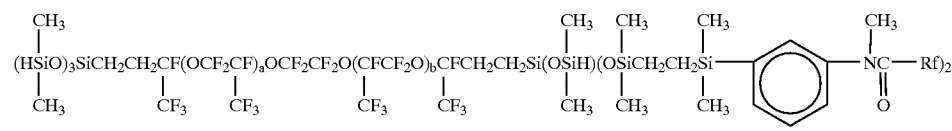

$\overline{a+b} = 2$ Rf: F—(CFCF$_2$O)$_n$—CF— $\overline{n} = 50$
| | CF$_3$ CF$_3$ -continued
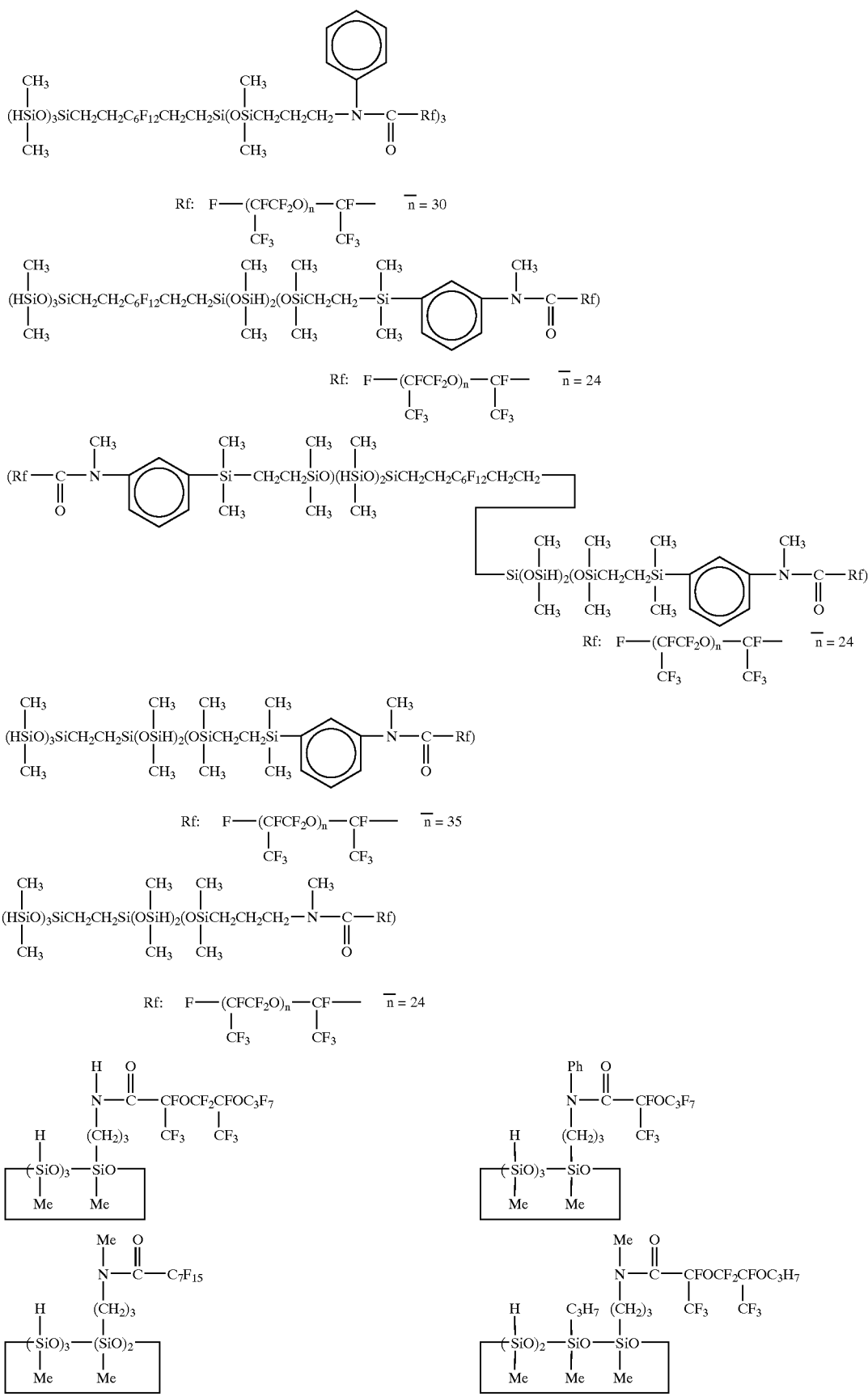

-continued
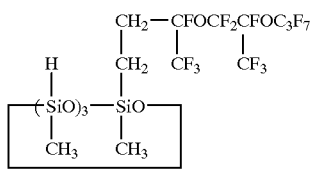
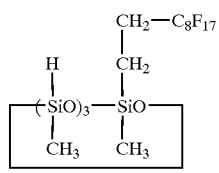
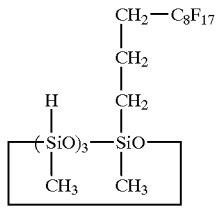
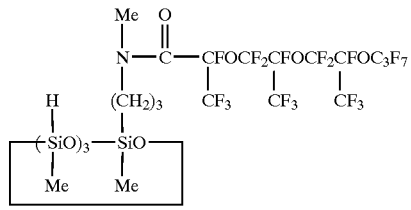
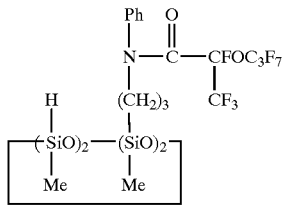
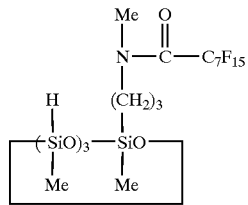
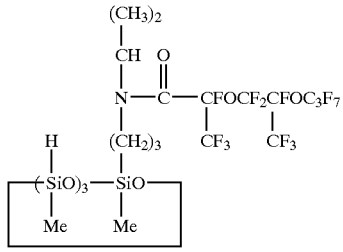
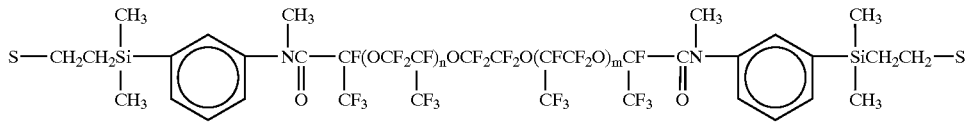
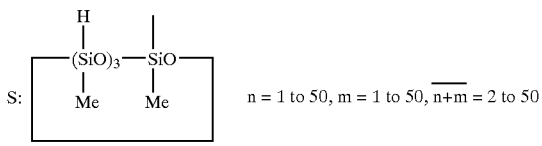
n = 1 to 50, m = 1 to 50, $\overline{n+m}$ = 2 to 50
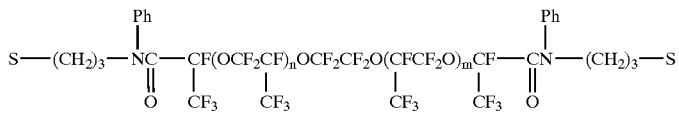
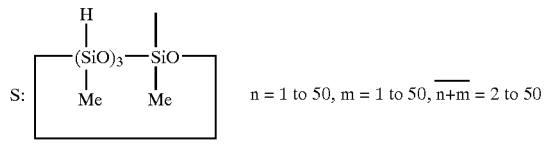
n = 1 to 50, m = 1 to 50, $\overline{n+m}$ = 2 to 50
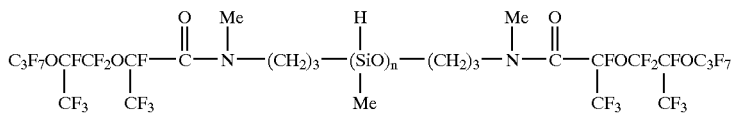
$\overline{n}$ = 3 to 50

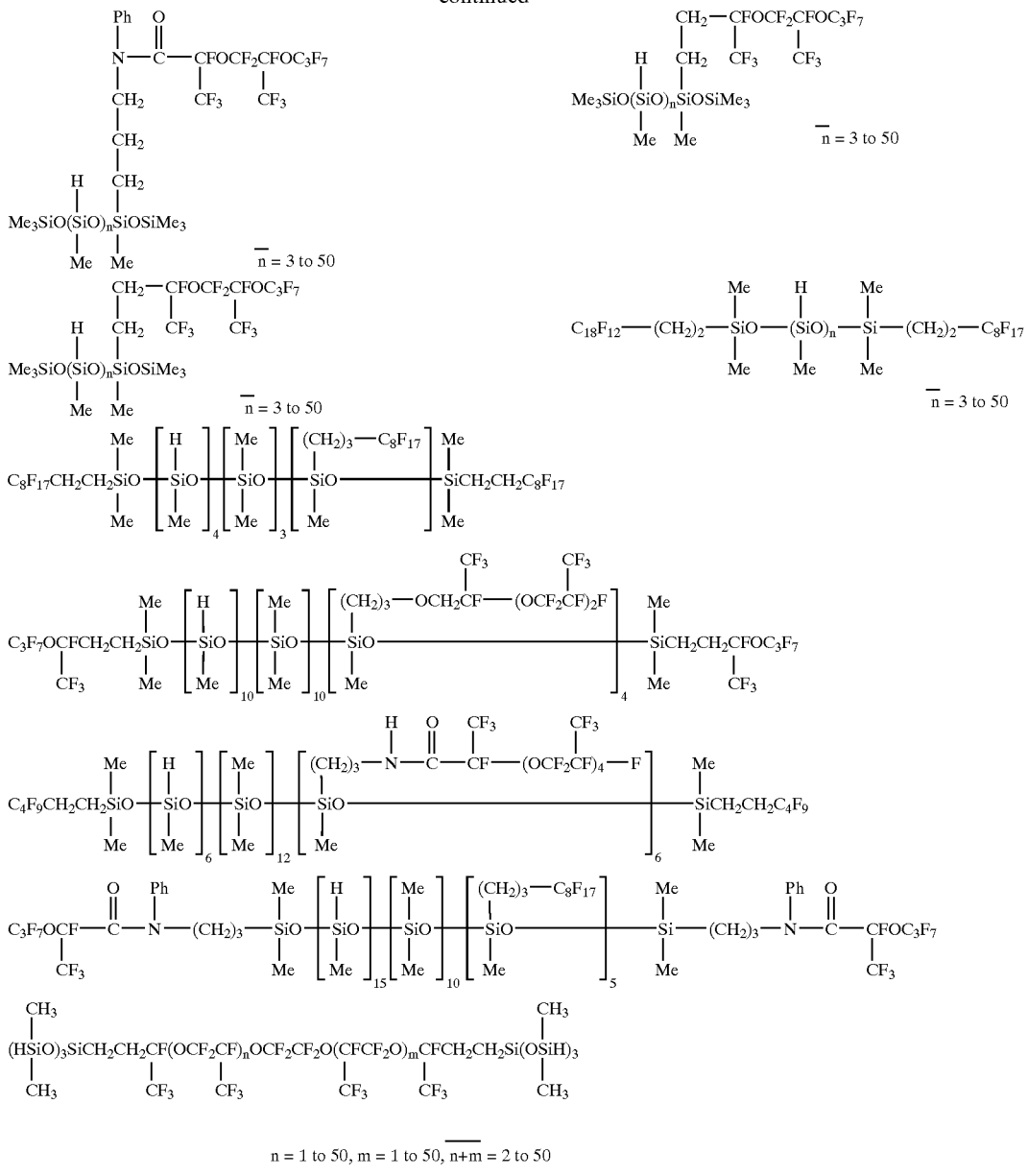

Component (B) is preferably used in such amounts that 0.5 to 3 mol, more preferably 0.8 to 2 mol of hydrosilyl radicals (i.e., Si—H radicals) are available per mol of alkenyl radicals that component (A) in the composition possesses. Amounts of component (B) giving less than 0.5 mol of Si—H radicals may achieve an insufficient degree of crosslinking, failing to form cured products. With excessive amounts of component (B), foaming may occur.

Component (C)

Component (C) of the inventive composition is a platinum group compound for promoting addition reaction or hydrosilylation between alkenyl radicals in component (A) and hydrosilyl radicals in component (B). Of the platinum group metal catalysts, platinum compounds which are relatively easily available are often employed. The platinum compounds include, for example, chloroplatinic acid, complexes of chloroplatinic acid with olefins (e.g., ethylene), alcohols, vinylsiloxanes and the like, and metallic platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph is phenyl.

Component (C) may be used in a catalytic amount. An appropriate amount is about 0.1 to 500 parts by weight of platinum group metal per million parts by weight of components (A) and (B) combined.

Component (D)

Component (D) is a hydrophobic silica powder, which serves to impart adequate physical strength to the cured composition and helps the organosiloxane (E) disperse in the composition uniformly. The hydrophobic silica powder (D) is typically particulate silica having a BET specific surface area of at least 50 $m^2/g$, and especially 50 to 400 $m^2/g$, which is well known as the filler for silicone rubber. With a BET specific surface area of less than 50 $m^2/g$, the object of the invention is hardly attainable. Exemplary of the particulate silica are fumed silica, precipitated silica, colloidal silica, and silica aerogel, with the fumed silica being most preferred. The particulate silica is typically subjected to surface hydrophobizing treatment. The agents for hydrophobizing silica particulates include organochlorosilanes, organodisilazanes, cyclic organopolysilazanes, linear organopolysiloxanes, etc. Of these, organochlorosilanes, organodisilazanes and cyclic organopolysilazanes are preferred.

An appropriate amount of component (D) added is 0.5 to 40 parts, and preferably 1.0 to 30 parts by weight per 100 parts by weight of component (A). Less than 0.5 part of component (D) may fail to give cured products sufficient physical properties and consistent adherence. More than 40 parts of component (D) may obstruct the flow of the composition and adversely affect the physical strength of cured products.

Component (E)

Component (E) is an organosiloxane having a hydrogen atom attached to a silicon atom and a trialkoxy or trialkyl-containing organic radical attached to a silicon atom in a molecule. The organic radical has the general formula (1):

wherein $R^1$ is an alkoxy radical of 1 to 4 carbon atoms or an alkyl radical of 1 to 4 carbon atoms, $R^2$ is hydrogen or methyl, and "a" is an integer of 2 to 10. The inclusion of component (E) allows the inventive composition to develop full self-adherence at relatively low curing temperatures.

In formula (1), $R^1$ is an alkoxy radical of 1 to 4 carbon atoms or an alkyl radical of 1 to 4 carbon atoms. Examples of $C_{1-4}$ alkoxy radical include methoxy, ethoxy, n-propoxy and i-propoxy. Examples of $C_{1-4}$ alkyl radical include methyl, ethyl, n-propyl and i-propyl. Of these, methoxy is preferred. $R^2$ is hydrogen or methyl, with hydrogen being preferred. The subscript "a" is an integer of 2 to 10, and preferably 2 or 3.

These organosiloxanes can be prepared by conventionally effecting partial addition reaction of an organohydrogenpolysiloxane having at least three silicon atom-bonded hydrogen atoms (Si—H radicals) in a molecule, a compound having an acryloyl or methacryloyl radical and a trialkoxysilyl or trialkylsilyl radical, and optionally, a compound having an aliphatic unsaturated radical and a perfluoroalkyl or perfluorooxyalkyl radical. The total number of acryloyl or methacryloyl radicals and aliphatic unsaturated radicals should be smaller than the number of Si—H radicals.

In conjunction with the preparation of the organosiloxane, the end compound may be isolated after the completion of reaction, although the reaction mixture from which only the unreacted reactants and the addition reaction catalyst have been removed may be used as well.

The siloxane skeleton of the organosiloxane may be cyclic, chain-like or branched, or mixtures thereof. The preferred organosiloxanes used herein are represented by the average compositional formulae below.

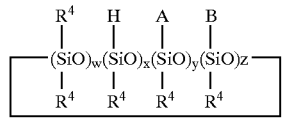

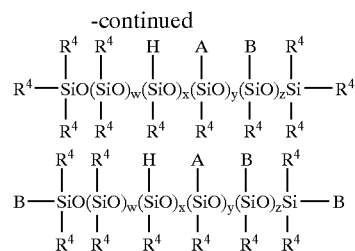

In the above formulae, $R^4$ is a substituted or unsubstituted monovalent hydrocarbon radical, A and B are defined below, w, x, y and z are $0 \leq w \leq 100$, $1 \leq x \leq 100$, $1 \leq y \leq 100$, and $0 \leq z \leq 100$.

The substituted or unsubstituted monovalent hydrocarbon radicals represented by $R^4$ are preferably those having 1 to 12 carbon atoms, more preferably 1 to 10 carbon atoms. Examples include alkyl radicals such as methyl, ethyl, propyl, butyl, hexyl, cyclohexyl and octyl, aryl radicals such as phenyl and tolyl, aralkyl radicals such as benzyl and phenylethyl, and substituted monovalent hydrocarbon radicals in which some or all of the hydrogen atoms are substituted with halogen atoms such as fluorine. Of these, methyl is most preferred.

Preferably, w, x, y and z are independently $0 \leq w \leq 20$, $1 \leq x \leq 20$, $1 \leq y \leq 20$, $1 \leq z \leq 20$, and $3 \leq w+x+y+z \leq 50$.

A is an organic radical of the general formula (1):

wherein $R^1$, $R^2$ and "a" are as defined above.

B is a monovalent perfluoroalkyl or perfluorooxyalkyl radical attached to a silicon atom through a carbon atom. Examples of suitable monovalent perfluoroalkyl or perfluorooxyalkyl radicals include those of the general formulae:

wherein s is as defined above, and

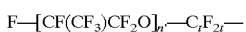

wherein n' and t are as defined above.

Examples of the organosiloxane used as component (E) include those of the following structural formulae. They may be used alone or in admixture of two or more. Note that Me is methyl.

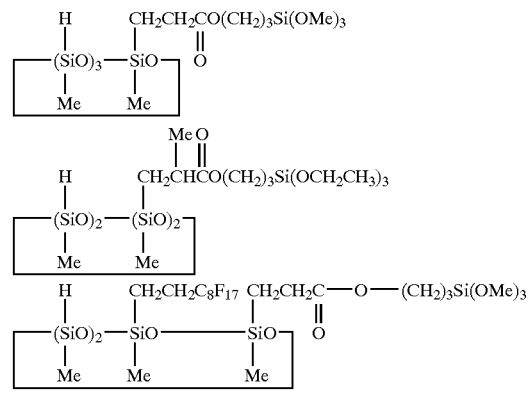

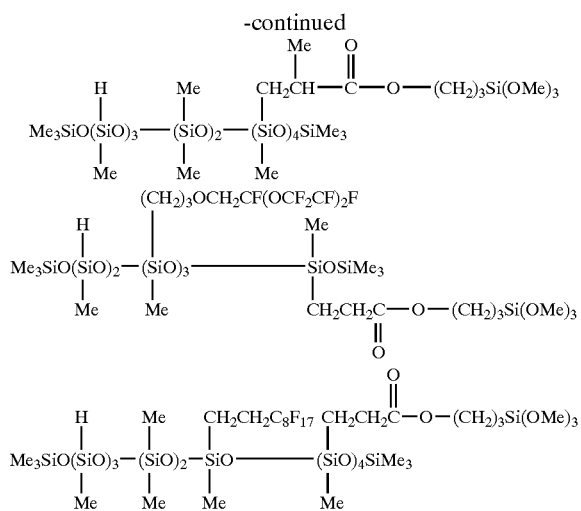

An appropriate amount of component (E) blended is 0.1 to 20 parts by weight, more preferably 0.3 to 10 parts by weight per 100 parts by weight of component (A). Less than 0.1 part may be too small to provide a sufficient adhesive force whereas more than 20 parts may adversely affect the physical properties of cured products or interfere with curing.

Other Components

In addition to the above-mentioned essential components (A) to (E), other optional components may be added to the inventive composition. Typical additives include plasticizers, viscosity modifiers, flexibility-imparting agents, regulators for hydrosilylation reaction catalysts, inorganic fillers, adhesion accelerators, adhesive aids other than component (E), and silane coupling agents. These additives may be compounded in any desired amounts as long as the objects of the invention are not compromised and as long as the properties of the composition and the physical properties of cured products are not impaired.

As the plasticizers, viscosity modifiers, and flexibility-imparting agents, a polyfluoromonoalkenyl compound of the general formula (3) and/or straight-chain polyfluoro compounds of the general formulae (4) and (5) may be used in combination.

$$Rf^2\text{—}(X')_b\text{—}CH\text{=}CH_2 \quad (3)$$

Herein X' and b are as defined above, $Rf^2$ is a radical of the general formula (iii):

$$F\text{—}[CF(CF_3)CF_2O]_f\text{—}C_tF_{2t}\text{—} \quad (iii)$$

wherein t is as defined above, and f is an integer of 1 to 200, preferably 1 to 150, which is smaller than any of the sum of p+q (average) and r and the sum of u and v for $Rf^1$ in component (A).

$$D\text{—}O\text{—}(CF_2CF_2CF_2O)_c\text{—}D \quad (4)$$

Herein D is a radical: $C_{s'}F_{2s'+1}$— wherein s' is 1 to 3, and c is an integer of 1 to 200, which is smaller than any of the sum of p+q (average) and r and the sum of u and v for $Rf^1$ in component (A).

$$D\text{—}O\text{—}(CF_2O)_d(CF_2CF_2O)_e\text{—}D \quad (5)$$

Herein D is as defined above, d and e each are an integer of 1 to 200, and the sum of d+e is smaller than any of the sum of p+q (average) and r and the sum of u and v for $Rf^1$ in component (A).

Illustrative examples of the polyfluoromonoalkenyl compound of formula (3) are given below. Note that m in the following formulae satisfies the requirement of formula (3).

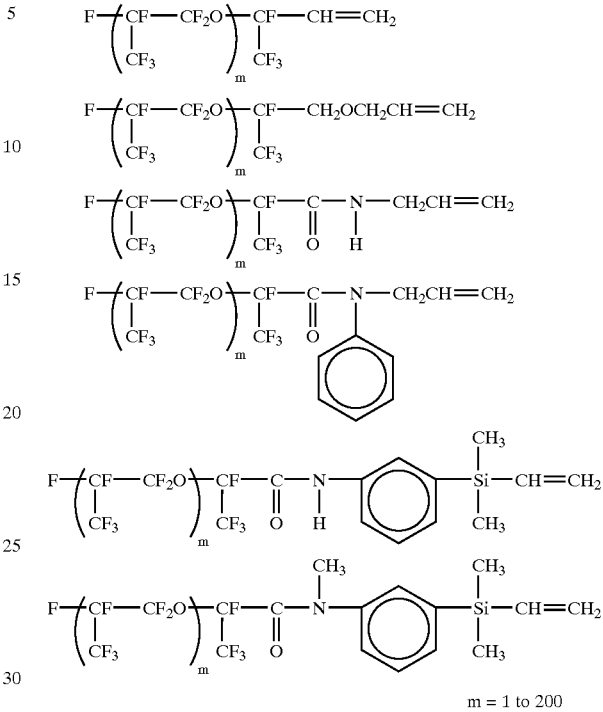

m = 1 to 200

Illustrative examples of the straight-chain polyfluoro compounds of formulae (4) and (5) are given below. Note that n or the sum of n+m in the following formulae satisfies the requirement of formula (4) or (5).

$$CF_3O\text{—}(CF_2CF_2CF_2O)_n\text{—}CF_2CF_3$$

$$CF_3\text{—}[(OCF_2CF_2)_n(OCF_2)_m]\text{—}O\text{—}CF_3$$

Herein m+n is 1 to 200, m is 1 to 200, and n is 1 to 200.

An appropriate amount of the polyfluoro compound of formula (3) to (5) blended is 1 to 300 parts by weight, more preferably 50 to 250 parts by weight per 100 parts by weight of the polyfluorodialkenyl compound of formula (2) in the composition. The viscosity (23° C.) of the polyfluoro compound is desirably in a range of 5 to 100,000 mPa·s, like the polyfluorodialkenyl compound.

Suitable regulators for hydrosilylation catalysts include, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, 3-methyl-3-penten-1-yne, 3,5-dimethyl-3-hexen-1-yne, triallyl isocyanurate, polyvinylsiloxane compounds, and organic phosphorus compounds. These regulators are effective for maintaining curing reactivity and storage stability appropriate.

Suitable inorganic fillers include, for example, reinforcing or semi-reinforcing fillers such as quartz flour, fused quartz flour, diatomaceous earth, and calcium carbonate; inorganic pigments such as titanium oxide, iron oxide, carbon black, and cobalt aluminate; heat resistance improvers such as titanium oxide, iron oxide, carbon black, cerium oxide, cerium hydroxide, zinc carbonate, magnesium carbonate, and manganese carbonate; heat transfer agents such as alumina, boron nitride, silicon carbide, and metal powders; and electroconductive agents such as carbon black, silver powder, and electroconductive zinc white.

There may be added adhesion accelerators such as carboxylic anhydrides and titanates, adhesive aids other than component (E), and silane coupling agents as well.

Curable Composition

The curable composition of the invention can be prepared by simply combining components (A) to (E) and optional components in a mixing apparatus such as a planetary mixer or three-roll mill.

The curable composition thus prepared will cure at room temperature depending on the functional radical on polyfluorodialkenyl compound (A) and the identity of catalyst (C). Heating is recommended in order to accelerate curing. For acquiring effective adhesion to a variety of substrates, the composition is preferably cured by heating at a temperature of at least 60° C., more preferably 100 to 200° C. for a time of several minutes to several hours.

Depending on the intended application and purpose, the curable composition of the invention may be dissolved in a suitable fluorinated solvent such as 1,3-bis(trifluoromethyl)benzene or Fluorinert (3M) in a desired concentration, prior to use.

The curable compositions of the invention are useful as the adhesive for automotive parts and electric/electronic parts of heat vulnerable resins. More illustratively, they are useful as the adhesive and protective potting agent for detectors and sensors used in automobile control systems, such as pressure sensors, VVT sensors, gas concentration detectors, and temperature sensors; the protective sealing agent for sensors and instruments exposed to gases, hot water and chemicals; the adhesive for ink jet printers; the adhesive and sealant for printer heads; the coating agent to rolls and belts in laser printers and copiers; and the adhesive and potting agent for various circuit boards.

The curable compositions of the invention cure into products having improved solvent resistance, chemical resistance, heat resistance, low-temperature properties, low moisture permeability and electric properties and exhibit good adhesion to a variety of substrates including metals and plastics by brief heating at relatively low temperatures.

EXAMPLE

Examples of the invention are given below by way of illustration and not by way of limitation. Parts are by weight. Me is methyl. Viscosity (in centistoke, cSt) and bond strength are measurements at 25° C.

Example 1

100 parts of a polymer having formula (6) (viscosity 5,600 cSt) was combined with 5 parts of Aerosil R976 (Nippon Aerosil Co., Ltd.). This was further combined with 0.3 part of a 50% toluene solution of ethynyl cyclohexanol, 0.2 part of a toluene solution containing a vinylsiloxane complex of chloroplatinic acid (platinum metal concentration 0.5 wt %), 1.7 parts of a compound having formula (7), 1.1 parts of a compound having formula (8), and 1.0 part of a compound having formula (9). These components were mixed to form a composition.

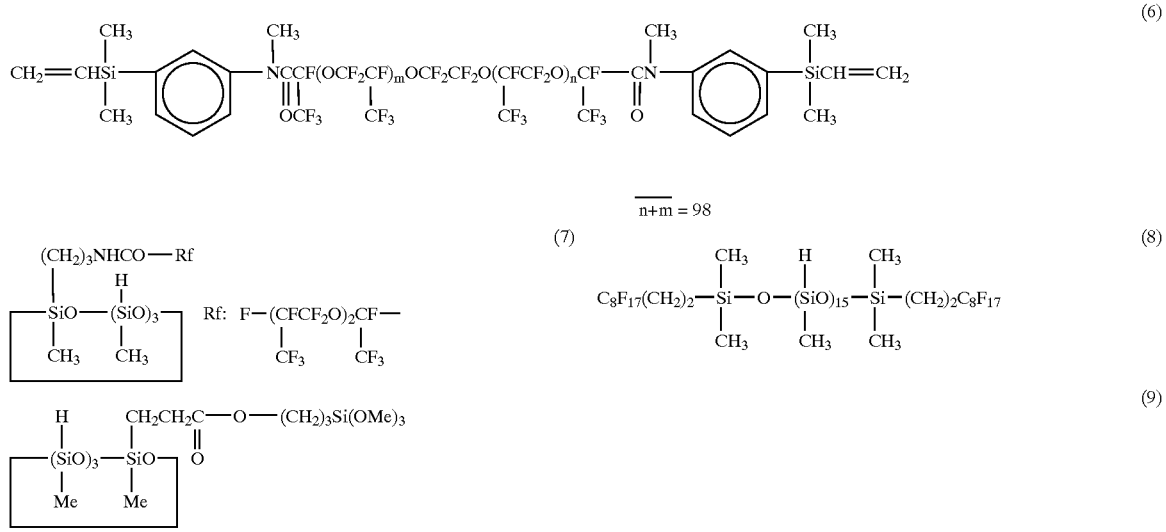

A 1 mm thick layer of the composition was sandwiched between two 100×25 mm test panels of an adherend material (aluminum, stainless steel, nickel, polybutylene terephthalate resin, or epoxy resin listed in Table 1), the panels being arranged so as to mutually overlap by 10 mm at the ends. The composition was then cured by heating at 100° C. for 1 hour, thereby giving an adhesion test specimen. Each of the resulting specimens was subjected to a tensile shear bond test (pulling speed 50 mm/min), and the shear bond strength (kgf/cm²) and cohesive failure (area %) were determined. The results are shown in Table 1.

Example 2

A composition was prepared as in Example 1 except that 1.5 parts of a compound of formula (10) below was used instead of the compound of formula (9). A tensile bond test was similarly carried out, with the results being shown in Table 1.

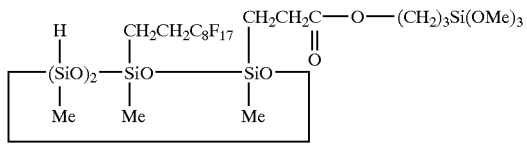
(10)

Example 3

A composition was prepared as in Example 1 except that fumed silica surface treated with hexamethyldisilazane (BET specific surface area 180 m²/g) was used instead of Aerosil R976. A tensile bond test was similarly carried out, with the results being shown in Table 1.

Comparative Example 1

A composition was prepared as in Example 1 except that 1.0 part of a compound of formula (11) below was used instead of the compound of formula (9). A tensile bond test was similarly carried out, with the results being shown in Table 1.

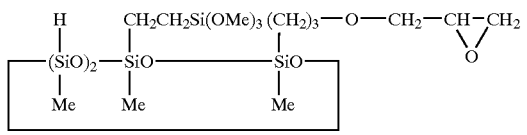
(11)

Comparative Example 2

A composition was prepared as in Example 1 except that 1.0 part of a compound of formula (12) below was used instead of the compound of formula (9). A tensile bond test was similarly carried out, with the results being shown in Table 1.

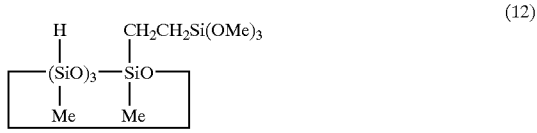
(12)

TABLE 1

| Shear bond strength (kgf/cm²) | | Example | | | Comparative Example | |
|---|---|---|---|---|---|---|
| | | 1 | 2 | 3 | 1 | 2 |
| Adherend | Aluminum | 15(100) | 17(100) | 13(100) | 12(80) | 10(60) |
| | Stainless steel | 14(100) | 14(100) | 12(100) | 11(60) | 9(40) |
| | Nickel | 12(100) | 13(100) | 11(100) | 8(0) | 5(0) |
| | PBT resin | 12(100) | 12(100) | 11(100) | 7(0) | 6(0) |
| | Epoxy resin | 15(100) | 14(100) | 13(100) | 10(50) | 8(20) |

Cohesive failure (area %) is given in parentheses.

Japanese Patent Application No. 2002-311087 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable composition comprising
   (A) a polyfluorodialkenyl compound having at least two alkenyl radicals in a molecule,
   (B) a fluorinated organohydrogensiloxane having at least two hydrogen atoms each attached to a silicon atom in a molecule,
   (C) a platinum group compound,
   (D) a hydrophobic silica powder, and
   (E) an organosiloxane having a hydrogen atom attached to a silicon atom and an organic radical attached to a silicon atom in a molecule, the organic radical being represented by the general formula (1):

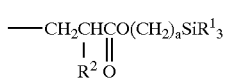
(1)

wherein $R^1$ is an alkoxy radical of 1 to 4 carbon atoms or an alkyl radical of 1 to 4 carbon atoms, $R^2$ is hydrogen or methyl, and "a" is an integer of 2 to 10.

2. The curable composition of claim 1 wherein component (A) comprises a polyfluorodialkenyl compound of the following general formula (2):

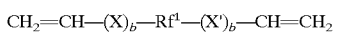
(2)

wherein X is a divalent radical represented by —CH$_2$—, —CH$_2$O—, —CH$_2$OCH$_2$— or —Y—NR$^3$—CO— wherein Y is a divalent radical represented by —CH$_2$— or

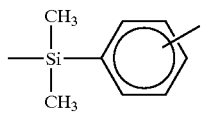

and $R^3$ is hydrogen or a substituted or unsubstituted monovalent hydrocarbon radical, X' is a divalent radical represented by —CH$_2$—, —OCH$_2$—, —CH$_2$OCH$_2$— or —CO—NR$^3$—Y'— wherein Y' is a divalent radical represented by —CH$_2$— or

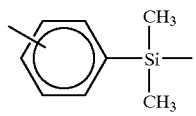

and $R^3$ is as defined above, "b" is independently equal to 0 or 1,

Rf$^1$ is a divalent radical having the general formula (i):

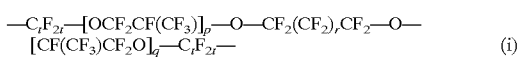
(i)

wherein p and q each are an integer of 1 to 150, the sum of p and q on average is 2 to 200, r is an integer of 0 to 6, and t is 2 or 3, or the general formula (ii):

(ii)

wherein u is an integer of 1 to 200, v is an integer of 1 to 50, and t is as defined above.

3. The curable composition of claim 1 wherein the fluorinated organohydrogenpolysiloxane (B) has at least one monovalent perfluoroalkyl, monovalent perfluorooxyalkyl, divalent perfluoroalkylene or divalent perfluorooxyalkylene radical in a molecule.

4. The curable composition of claim 1 wherein the organosiloxane (E) further has at least one monovalent perfluoroalkyl or monovalent perfluorooxyalkyl radical attached to a silicon atom through a carbon atom.

* * * * *